United States Patent [19]

Hebenstreit

[11] 3,816,195

[45] June 11, 1974

[54] METHOD OF MAKING CONDUCTOR PLATE WITH CROSSOVER

[75] Inventor: Ernst Hebenstreit, Munich, Germany

[73] Assignee: Siemens Aktiengesellschaft, Berlin & Munich, Germany

[22] Filed: Aug. 10, 1972

[21] Appl. No.: 279,502

[30] Foreign Application Priority Data

Sept. 2, 1972 Germany .......................... 2144078

[52] U.S. Cl. .......................... 156/3, 156/8, 156/11, 174/68.5

[51] Int. Cl. .......................................... C23f 1/02

[58] Field of Search ............... 156/3, 8, 11; 96/36.2; 117/212; 174/68.5

[56] References Cited

UNITED STATES PATENTS

| | | | |
|---|---|---|---|
| 3,366,519 | 1/1968 | Pritchard et al. | 96/36.2 X |
| 3,395,040 | 7/1968 | Pritchard et al. | 117/212 |
| 3,525,617 | 8/1970 | Bingham | 96/36.2 |
| 3,700,445 | 10/1972 | Croson | 156/17 X |

*Primary Examiner*—William A. Powell
*Attorney, Agent, or Firm*—Hill, Gross, Simpson, Van Santen, Steadman, Chiara & Simpson

[57] ABSTRACT

Printed circuit type of carrier plate and method of producing the plate by printed circuit technology. The carrier plate is made from an insulated plate having a copper layer extending over its top surface and has a conductor path extending transversely of the plate and at least one other conductor path at right angles to the first conductor path, and having a crossover insulated from the transverse conductor path to form a continuous conductor path extending across the transverse conductor path.

16 Claims, 7 Drawing Figures

METHOD OF MAKING CONDUCTOR PLATE WITH CROSSOVER

FIELD OF THE INVENTION

Printed circuit and method of making conductor plate with crossovers crossing and insulated from a conductor path on one side of the plate.

BACKGROUND, SUMMARY, ADVANTAGES AND OBJECTS OF INVENTION

A problem encountered in the production of conductor plates is to provide crossovers of different conductor paths in which the crossovers are on one side of the plate and insulated from the conductor path they cross. In order to provide the crossovers, the conductor plates, which are made of an insulating material, have heretofore been provided with a metal layer on both sides of the plate, as for example, a copper foil. In order to provide the crossovers of the conductor paths, the conductor paths extending in one direction are applied on one side of the plate by etching the copper foil and the conductor paths extending perpendicularly thereto are applied to the opposite side of the plate by etching and contact is made through the plate to the required electrically insulated crossovers.

In a German Offenlegungsschrift 1,665,697 of Mar. 18, 1971, crossovers of conductor paths have been provided on one and the same side of the conductor plate by reducing the thickness of one conductor path, by means of etching, in order to produce a crossover, and by providing the reduced thickness or recessed portion of the conductor path with an insulating material. The crossing conductor paths are then produced by a metal coating extending over the surface of this insulating material.

In accordance with the principles of the present invention, I produce an improved and simpler conductor plate with crossing conductor paths without reducing the thickness of the conductor paths by coating a conductor path extending in one direction along a carrier plate with a hardenable electrically insulating material and by providing a conductor-path bridge at the crossover produced by subsequent metalizing, and deposited directly on the electrically insulating material and on the metal of the metal layer on the carrier plate at its end points, in such a way that crossing conductor paths are formed from the metal layer provided on the carrier plate and provide a bridge over the electrically insulating material.

The method of the present invention has proven particularly advantageous for the production of a conductor plate with crossing conductor paths, and in accordance with the principles of the invention, a partial surface corresponding to the outline of a conductor-path section, which is to be coated with insulating material, is covered by a thin resistant layer and the metal layer on the carrier plate including the partial surface covered by the thin resistant layer is covered by a coating made of photo-sensitive material. A thickness is selected for the coating of photo-sensitive material corresponding essentially to the distance from the metal layer 3 to the top of the insulation coating encapsulating the conductor path, which is perpendicular to the insulating coating, and later encapsulates the perpendicular conducting path. An area for the insulation coating is then removed from the photo-sensitive coating by a photographic process, to produce a recess corresponding to the outline of the planned insulating coating, and the parts of the metal layer which are neither covered by the photo-sensitive coating nor by the resistant layer, are then removed and the recess is treated with an applicable, hardenable, electrically insulating material, so that the recess produced in the photo-sensitive coating and in the metal layer is filled with the hardenable electrically insulating material. As the hardenable material in the recess is hardened, the photo-sensitive coating is removed without impairing the insulating material in the recess. The surface of the metal layer and of the insulating material in the recess is then covered by a further metal and the missing structures of the conductor paths are produced in the metal layer and the coating layer by metal coating.

While the process is carried out on one side of a carrier plate, it can advantageously be carried out on both sides of a carrier plate and the crossover may be on one or both sides of the plate, which facilitates the production of circuit topography for a so-called printed circuit. It should here be understood that the expression "printed circuit" not only includes conventional printed circuit technology but also includes carrier plates with hybrid and integrated circuits which have been produced by other methods than technical printing methods.

The advantages of the present invention, therefore, are the better utilization of a conductor plate surface and the avoiding of individual contactings through the conductor plate for crossing conductors for the sole purpose of the crossover.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

DESCRIPTION OF PREFERRED EMBODIMENTS OF INVENTION

Figure 1:
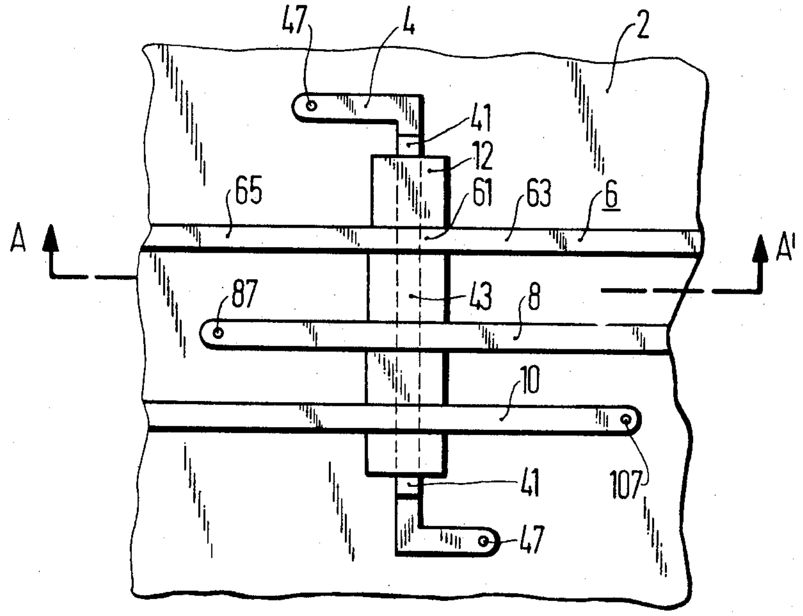
FIG. 1 is a top plan view of a carrier plate illustrating the bridging of a conductor path by three other conductor paths.
Figure 2:
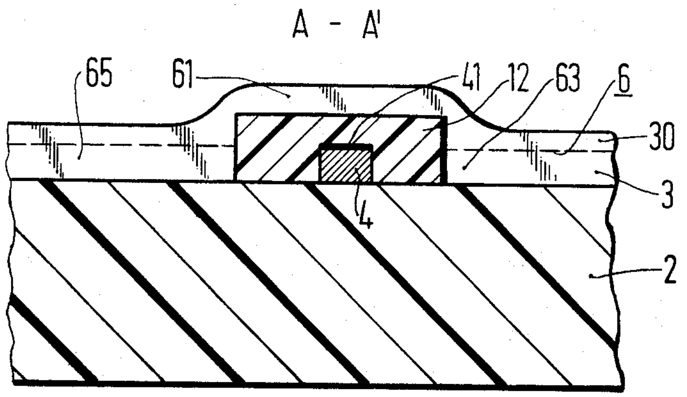
FIG. 2 is a sectional view taken substantially along line II—II of FIG. 1.

In FIGS. 1 and 2 of the drawings, reference numeral 2 designates a carrier plate of a type commonly used for printed circuits which may be made from a hard insulating paper. One such paper suitable for use in printed circuits is a bakelized paper. The carrier 2 has a metal layer 3 on one side thereof and shown in FIG. 2 and terminating at the dashed line denoting the bottom of the metalized layer of a conductor path 6. The carrier plate 2 is shown in FIG. 1 in the form it will attain after the carrying out of the method steps, according to the principles of this invention, as will hereinafter be more fully explained as this specification proceeds.

The carrier plate, as shown, has a conductor path 4 extending thereacross and conductor paths 6,8 and 10 extending across insulation 12 encapsulating the conductor path 4. The encapsulating coating extends about the conductor path 4 as shown in FIG. 2 to the top of the insulating carrier plate 2. The conductor path 6, as shown in FIG. 2, extends over the insulating material 12 along a bridge 61 completing the electrical connection between front and rear pieces 63 and 65 of the conductor path, to provide a continuous conductor extending over and at right angles with respect to the conductor 4 along the bridge 61, and insulated from the conductor 4 by the insulating material 12. The conductor paths 8 and 10 are bridged over the conductor path 4 in the same manner the conductor path 6 is bridged over said conductor path 4, so a detailed description thereof need not be repeated herein.

A thin resistant layer 41 extends along the conductor 4 on the side thereof facing away from the carrier plate, and may be resistant to etching or galvanic removal of the metal of the metal layer of said conductor path and is further resistant against the agent for removing the layer made of photo-sensitive material, as will hereinafter more clearly appear as this specification proceeds.

FIG. 1 illustrates a sample of a diagrammatic embodiment of the invention with the individual non-illustrated component elements connected to the conductor paths not illustrated, for the purpose of simplicity. Holes 47,87 and 107 are provided for solder connecting of corresponding component elements and may, for example, contact the component elements through the carrier plate through holes leading therethrough in a manner well known to those skilled in the art, so not herein shown or described further.

Figure 3:
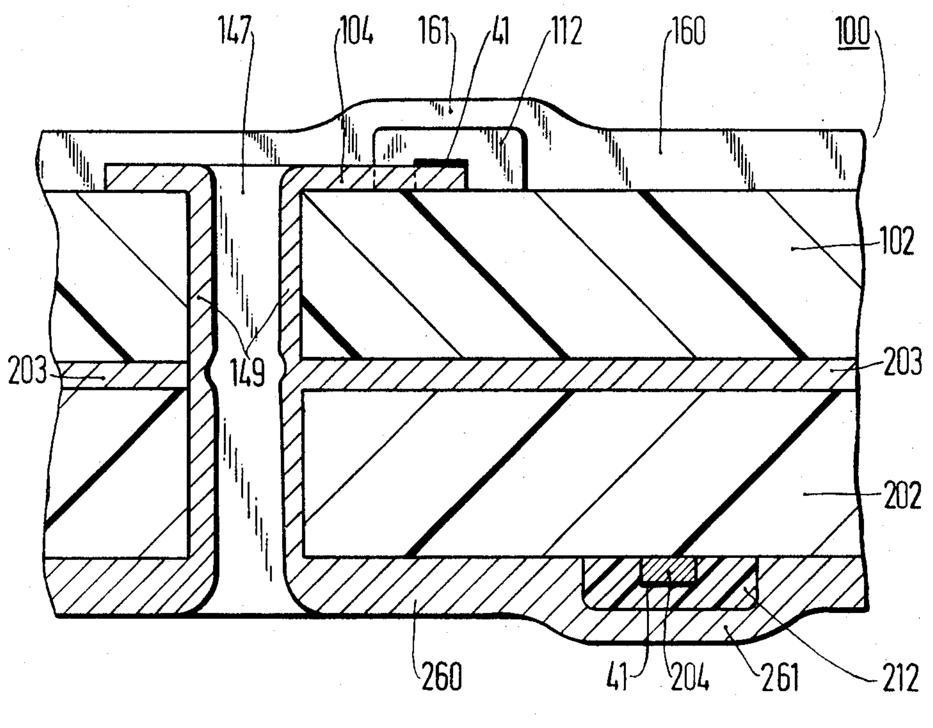
FIG. 3 is a sectional view of a modified form of the invention illustrating the use of the bridging principles of the invention with multilayer plates.
Figure 4:
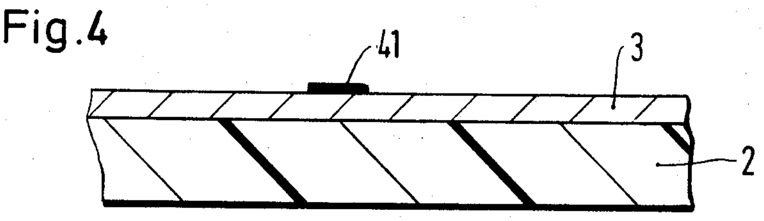
FIGS. 4 through 7 are diagrammatic views illustrating the method of producing the conductor paths and bridge in accordance with the principles of the present invention.

In FIG. 3 of the drawings, I have shown an embodiment of the invention comprising a multi-layer plate carrier generally indicated by reference numeral 100. The multi-layer plate carrier 100 is shown as comprising two interconnected carrier plates 102 and 202, which correspond to the plate 2 and are shown as having a drilled hole extending therethrough affording a means for providing electrical connections between opposite sides of the plates and between said plates. A conductor path 203 is shown as being disposed between the plates 102 and 202 and connected with a conductor path 260 on the bottom of the plates and a conductor path 104 on the top of the plates by a metal current conducting bushing 149. The current conducting bushing 149 may be formed by coating the boring or drilled hole 147 with an electrically conductive coating by the depositing of a conductive material as by galvanic deposition of the conductive material to afford electrical connections between the conductor paths 104, 203 and 260 as shown. The conductor path 104 and current conducting bushing 149 are spaced from and have no contact with the conductor path 260.

Referring now in particular to the method of production of a conductor plate in accordance with the principles of the present invention, as illustrated in FIGS. 4 through 7, which figures have the same reference numerals applied thereto for the same parts, as are shown in FIGS. 1,2 and 3.

A conventional carrier plate 2 made from an insulating material and having a metal layer 3 lining one side of the plate is provided. The metal layer 3 may be copper, and carrier plates with metal layers on one or both sides are produced commercially for the production of printed circuits.

A portion of the copper lining corresponding to the transverse conductor path 4 which is to be encapsulated in insulating material, is covered by a thin resistant layer 41, the resistant layer 41 may, for example, be produced by galvanic deposition along the copper layer while applying a photo-lithographic mask (not shown), or even by printing, as for example, in accordance with a screen printing method known to those skilled in the art.

In order that the conductor path 4 be not interrupted during later etching processes, the resistant layer 41 covers the region of the conductor path 4 for a greater distance than the portion of the conductor path which is to be encapsulated in insulating material and is slightly wider than the conductor path. The length and width of the resistant layer depends on whether an etching method, a galvanic remover or other methods are applied for the removal of the parts of the metal layer 3. In each method, a material is utilized for the resistant layer which is resistant against the agents applied by the respective method. The layer 41 should also be resistant against the agent for dissolving parts of a coating of photo-sensitive material as will hereinafter be more fully described as this specification proceeds.

Figure 5:
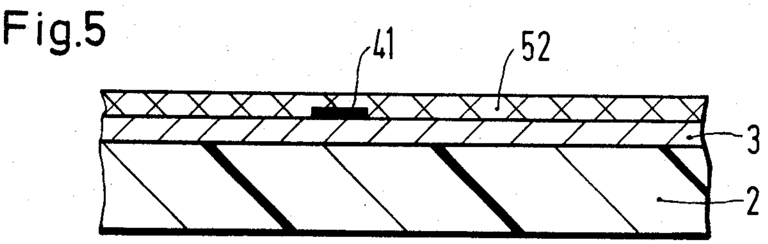

In the second method step, as shown in FIG. 5, an over-coating 52 of photo-sensitive material is applied on the metal layer 3 and the resistant layer 41. This coating may be of a thickness essentially equal to the distance the insulating material encapsulating the conductor path 4 projects above the conductor path 4, so the top of the coating is flush with the top of the insulating material. The layer or coating of photo-sensitive material may be a material known to the trade as KPR and manufactured and sold by Eastman Kodak Co. Still more advantage can be reached by using a foil consisting out of photo-sensitive material, which is suited for photographic purposes. Such foil being known to the trade as RISTON, manufactured ans sold by Du Pont.

Figure 6:
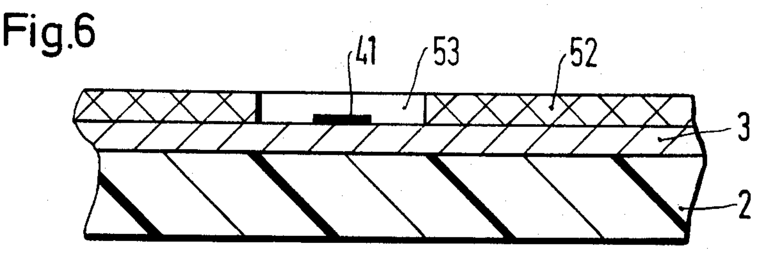

In the third method step as shown in FIG. 6, an area 53 of the coating 52 may be removed by a photographic process to form a recess extending along and beyond opposite sides of the conductor path 4 equal to the outline of the insulating coating which will encapsulate the conductor path 4.

In the next method step, the portion of the metal layer 3 not covered by the photo-sensitive layer 52 or the resistant layer 41 is removed. In this method step, the subpiece 43 of the conductor path 4, shown in dotted lines in FIG. 1 and to later be encapsulated in the insulation is then exposed. This produces the recess 53 in the metal layer 3 and in the coating 52 along each side of and above the subpiece 43 formed by the resistant layer to be encapsulated in the insulating coating 12.

The recess 53 may then be filled with a suitable hardenable, electric insulating material, which is provided for the encapsulating coating 12.

Figure 7:
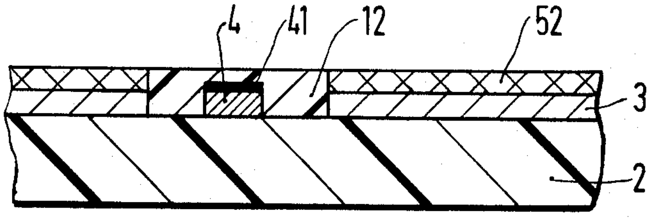

The insulating material may be an epoxy resin having a thixotropic agent therein and is preferably applied in the recess in a purely liquid or thixotropic state with the help of a wiper or stripper, as for example, a roller (not shown) in which a foil extending along the recess is interposed between the roller and the coating. This maintains the remaining surface of the coating 52 extending about the recess free from the insulating material, as shown in FIG. 7. This method step results in a conductor path extending across the board 2 and encapsulated in insulation cooperating with the surface of the board 2 to completely insulate the conductor path 4.

In the next method step, the portion of the coating still remaining on the metal layer 3 is removed from the metal layer. Then the surface of the insulating material is activated and then the layer 3 whole surface of the metal layer 3 and the insulating material 12 is thickened by galvanically applying electrically conductive material 30 thereto as indicated above the dotted line in FIG. 2. In this method step, the material required for the bridges of the later produced conductor paths 6,8 and 10 is applied as continuations of said conductor paths.

Then the missing structure of the conductor paths 6,8 and 10 and of the bridge as well as of the conductor path 3, not produced in the previous method steps is produced from the metal layers 3 and 30 so as by etching.

The conductor plate may be flushed and dried between the individual method steps to provide a clean final conduction plate.

It may be seen from the foregoing that a conductor plate can be simply and efficiently produced with a conductor-path structure having crossovers of one or several conductor paths, in accordance with the teachings of the present invention as illustrated in FIGS. 1 through 6 of the drawings and described herein.

I claim as my invention:

1. In a method of producing a conductor plate, the steps of:

providing a carrier plate made from an insulating material having a metal layer extending over one surface, coating a portion of a metal layer corresponding to a transverse conductor path with a thin resistant layer, covering the metal layer and thin resistant layer with a coating of photo-resist, removing the photo-resist by a photographic process along the resistant layer in an area encompassing the resistant layer, to form a recess extending along the resistant layer, removing the metal layer in this recess along opposite sides of the resistant layer to form a conductor path extending across said carrier plate and along said recess, filling the recess with a hardenable electrically insulating material, flush with the top of said photo-resistant material to encapsulate the transverse conductor path with said insulating material, removing the photo-resist then activating the surface of the insulating material and then depositing galvanically a further metal layer over the whole surface and then removing parts of the metal layer to form at least two aligned conductor paths extending to said insulating material and the connecting bridging part of said further metal layer.

2. The method of claim 1, characterized in that the resistant layer is applied along the metal layer to extend beyond both ends of the recess filled with electrical insulating material.

3. The method of claim 2, characterized in that the resistant layer is applied by means of screen printing.

4. The method of claim 2, characterized in that the resistant layer is produced galvanically by a photographic method.

5. The method of claim 1, wherein the coating of the metal layer with photo-sensitive material is carried out by coating the metal layer with a photo-sensitive foil.

6. The method of claim 1, including the steps of removing the parts of the metal layer which are neither covered by the photo-sensitive coating nor by the resistant layer by etching.

7. The method of claim 1, wherein the hardenable electrically insulating material is applied as an epoxy resin.

8. The method of claim 7, wherein the epoxy resin is provided with a thixotropic agent.

9. The method of claim 1, including the step of wiping the insulating material to form a continuation of the top surface of the photo-sensitive coating.

10. The method of claim 9, wherein the operation of wiping the insulating material includes the placing of a foil over the insulating material and rolling the foil with a roller.

11. The method of claim 1, including the step of removing the coating of photo-sensitive material by peeling the photo-sensitive material from a metal layer.

12. The method of claim 1, characterized in that the top surface of the insulating material is rendered electrically conductive by the deposition of current conducting metal thereacross.

13. The method of claim 12, including the step of further coating metal forming continuations of the metal extending across said insulation material by means of galvanic deposition of the metal therealong.

14. The method of claim 1, including the production of the missing structures by means of etching.

15. The method of claim 1, including the production of the missing structure by galvanic removal of the metal layer.

16. The method of claim 1, including the steps of flushing and drying the conductor plate between the individual method steps.

* * * * *